(12) United States Patent
Francois et al.

(10) Patent No.: US 11,068,303 B2
(45) Date of Patent: Jul. 20, 2021

(54) ADJUSTING THREAD BALANCING IN RESPONSE TO DISRUPTIVE COMPLEX INSTRUCTION

(71) Applicant: International Business Machines Corporation, Armonk, NY (US)

(72) Inventors: Avery Francois, Austin, TX (US); Gregory William Alexander, Pflugerville, TX (US); Christian Jacobi, West Park, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 220 days.

(21) Appl. No.: 16/278,936

(22) Filed: Feb. 19, 2019

(65) Prior Publication Data

US 2020/0264920 A1 Aug. 20, 2020

(51) Int. Cl.
| | | |
|---|---|---|
| *G06F 9/48* | (2006.01) | |
| *G06F 9/50* | (2006.01) | |
| *G06F 9/38* | (2018.01) | |
| *G06F 9/22* | (2006.01) | |

(52) U.S. Cl.
CPC .......... *G06F 9/4881* (2013.01); *G06F 9/226* (2013.01); *G06F 9/3836* (2013.01); *G06F 9/5038* (2013.01); *G06F 9/5044* (2013.01)

(58) Field of Classification Search
None
See application file for complete search history.

(56) References Cited

U.S. PATENT DOCUMENTS

| | | | |
|---|---|---|---|
| 5,895,492 A | 4/1999 | Greenspan et al. | |
| 7,149,829 B2 | 12/2006 | Weber et al. | |
| 7,603,502 B2 | 10/2009 | Richter et al. | |
| 7,831,975 B2 | 11/2010 | Ode | |
| 8,316,373 B2 | 11/2012 | Cheng et al. | |
| 8,560,814 B2* | 10/2013 | Golla | G06F 9/3889 712/220 |
| 8,909,788 B2 | 12/2014 | Heidenreich et al. | |
| 9,009,312 B2 | 4/2015 | Archer et al. | |
| 9,417,920 B2* | 8/2016 | Tran | G06F 9/3836 |
| 9,606,834 B2* | 3/2017 | Jackson | G06F 9/00 |

(Continued)

OTHER PUBLICATIONS

Boneti et al. "Balancing HPC Applications Through Smart Allocation of Resources in MT Processors", 2008 IEEE, pp. 1-12.*

(Continued)

*Primary Examiner* — Van H Nguyen
(74) *Attorney, Agent, or Firm* — Cantor Colburn LLP; William Kinnaman (57) ABSTRACT

A computer-implemented method is provided and includes allocating, by a processor, an instruction to a first thread, decoding, by the processor, the instruction, determining, by the processor, a type of the instruction based on information obtained by decoding the instruction, and based on determining that the instruction is a disruptive complex instruction, changing a mode of allocating hardware resources to an instruction-based allocation mode. In the instruction-based allocation mode, the processor adjusts allocation of the hardware resources among a first thread and a second thread based on types of instructions allocated to the first and second threads.

10 Claims, 6 Drawing Sheets

(56) References Cited

U.S. PATENT DOCUMENTS

| | | | |
|---|---|---|---|
| 10,209,998 B2* | 2/2019 | Yang | G06F 9/4881 |
| 10,282,296 B2* | 5/2019 | Brandt | G06F 12/1009 |
| 2015/0100965 A1* | 4/2015 | Tran | G06F 9/5011 |
| | | | 718/103 |
| 2015/0234759 A1 | 8/2015 | Tian et al. | |
| 2018/0165199 A1* | 6/2018 | Brandt | G06F 12/0831 |

OTHER PUBLICATIONS

Ju et al. "Thread Count Prediction Model: Dynamically Adjusting Threads for Heterogeneous Many-Core Systems", 2015 IEEE, pp. 456-464.*

* cited by examiner

ADJUSTING THREAD BALANCING IN RESPONSE TO DISRUPTIVE COMPLEX INSTRUCTION

BACKGROUND

The present invention generally relates to a method for adjusting thread balancing in a processor, and more specifically, to a method for adjusting the allocation of hardware resources among threads in response to a disruptive complex instruction.

A simultaneous multithreaded (SMT) processor is used to achieve higher efficiency than a single-threaded processor due to its ability to share "unused" functional units among differing threads. Thread balancing within the simultaneous multithreaded (SMT) processor is designed to optimally balance hardware resources among concurrently moving threads so that each thread can run as fast as it's capable of moving. In practice, this means giving a fast-moving thread a larger percentage of hardware resources compared to a slow-moving thread that may not necessarily need all of the shared resources it's been given, in general. As used herein, the term "fast-moving thread" refers to a thread that takes a relatively short time to finish processing of the instruction it has, and "slow-moving thread" refers to a thread that takes a relatively long time to finish processing of the instruction it has.

SUMMARY

In accordance with one or more embodiments of the present invention, a computer system that includes a memory storing a computer-executable instruction, and a processor. The processor is configured to allocate an instruction to a first thread, decode the instruction, determine a type of the instruction based on information obtained by decoding the instruction, and based on determining that the instruction is a disruptive complex instruction, change a mode of allocating hardware resources to an instruction-based allocation mode. In the instruction-based allocation mode, the processor adjusts the allocation of the hardware resources among a first thread and a second thread based on types of instructions allocated to the first and second threads.

In accordance with additional or alternative embodiments of the present invention, in response that a simple instruction is allocated to the second thread, fewer hardware resources than a number of the hardware resources allocated to the second thread are allocated to the first thread.

In accordance with additional or alternative embodiments of the present invention, a computer-implemented method is provided and includes allocating, by a processor, an instruction to a first thread, decoding, by the processor, the instruction, determining, by the processor, a type of the instruction based on information obtained by decoding the instruction, and based on determining that the instruction is a disruptive complex instruction, changing a mode of allocating hardware resources to an instruction-based allocation mode. In the instruction-based allocation mode, the processor adjusts the allocation of the hardware resources among a first thread and a second thread based on types of instructions allocated to the first and second threads.

In accordance with additional or alternative embodiments of the present invention, a computer program product comprising a computer readable storage medium having program instructions embodied therewith is provided. The program instructions executable by a processor causes the processor to perform a method including allocating a target instruction to a first thread, decoding the target instruction different from the program instructions, determining a type of the target instruction based on information obtained by decoding the target instruction, and based on determining that the target instruction is a disruptive complex instruction, changing a mode of allocating hardware resources to an instruction-based allocation mode. In the instruction-based allocation mode, the processor adjusts the allocation of the hardware resources among a first thread and a second thread based on types of instructions allocated to the first and second threads.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

One or more embodiments of the present invention provide a method to better partition hardware resources when a thread is running disruptive complex instructions that act poorly under a traditional thread-based allocation mode (so-called "slow-moving thread balancing techniques"). As used herein, the term "complex instruction" refers to an instruction that requires a lot of units of processor cycles (e.g., from a few cycles to 1000's of cycles), and the term "disruptive complex instruction" refers to a complex instruction that when executing on a thread in a multiple-thread processor, due to its characteristics, causes a thread balancing logic to produce too much unbalanced allocation of resources among threads (e.g., allocating too many resources to the thread executing the disruptive complex instruction, allocating too few resources to the thread executing the disruptive complex instruction, allocating too many resources to a thread executing at the same time as the disruptive complex instruction, or allocating too few resources to a thread executing at the same time as the disruptive complex instruction.) One or more embodiments of the present invention dynamically identifies the disruptive complex instructions and temporarily changes thread balancing techniques to better balance threads for a specific duration. According to one or more embodiments of the present invention, the simultaneous multithreaded (SMT) processor then seamlessly returns to the traditional thread-based allocation mode at the completion of the disruptive complex instruction or routine of instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
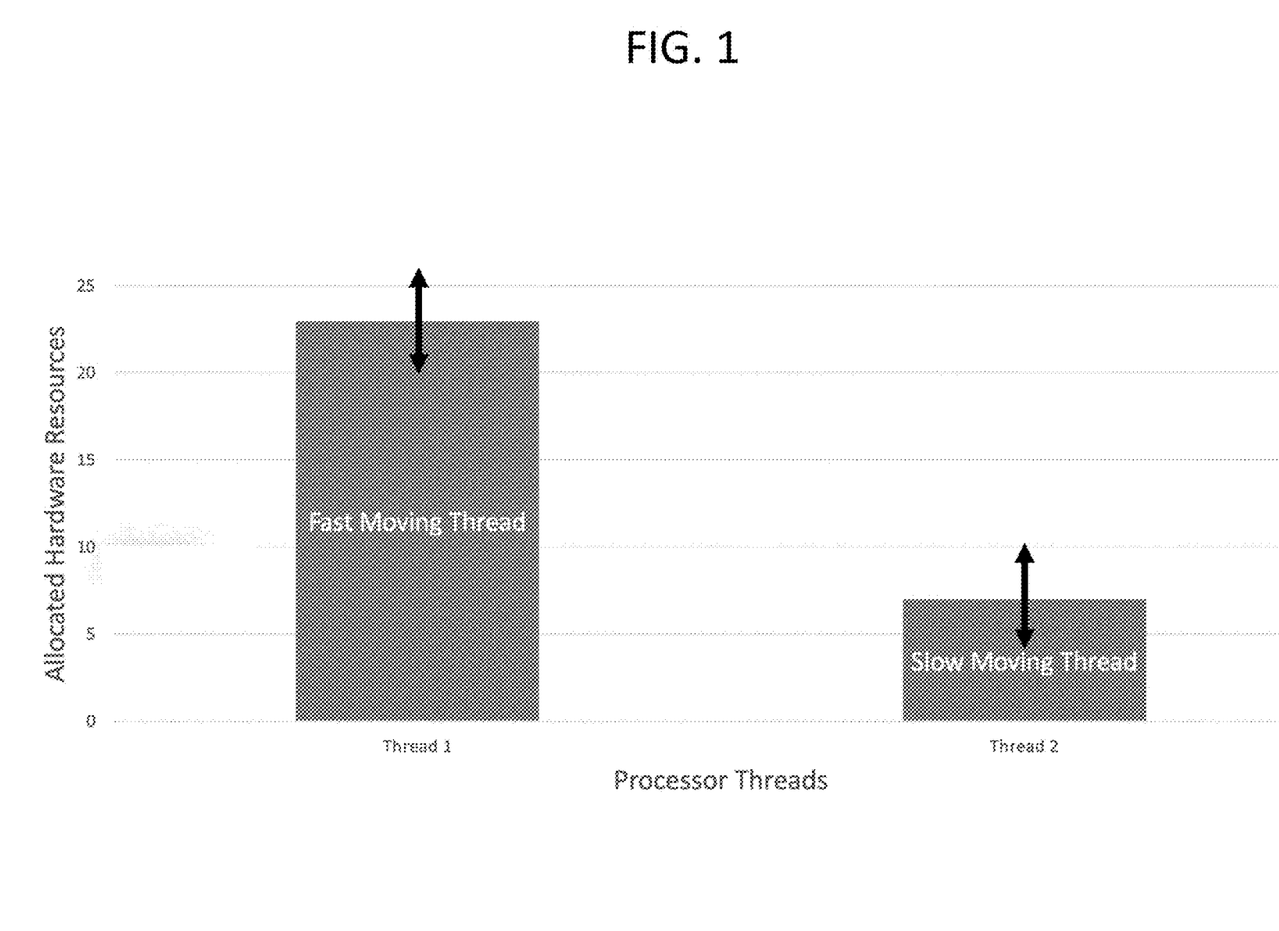
FIG. 1 depicts an example of good thread balancing for a simple case involving two threads competing over a pool of shared resources.

The traditional thread-based allocation mode keeps track of how threads utilize shared hardware resources and adjusts the allotment of hardware resources based upon tracking information obtained on a per-thread basis. FIG. 1 depicts an example of good thread balancing for a simple case involving two threads competing over a pool of shared resources such as a free list. Both threads are able to increase or decrease their allotment of resources, with more resources going to the fast-moving thread and fewer to the slow-moving thread. In general, it allows the ratio to get as great as 90% to the fast-moving thread and 10% to the slow-moving thread when running a fast-moving thread and a slow-moving thread, and when running similar workloads to two threads each thread may use between 40% to 60% of the resources. In general, whether a thread is fast-moving or slow-moving is determined by the environment of the thread or characteristics of the instructions the thread encounters. For example, if most of the instructions a thread receives are simple instructions, the thread can become the fast-moving thread. In contrast, if most of the instructions a thread receives are complex instructions, the thread can become the slow-moving thread. As used herein, the term "simple instruction" refers to an instruction that can be performed in one or few units of processor cycles (e.g., from one to ten cycles).

The traditional thread-based allocation method reacts poorly to the disruptive complex instructions which cause the SMT processor not to naturally indicate the instruction as the complex instruction. The disruptive complex instruction will cause a thread to run slow. A representative example of the disruptive complex instruction is a post-completion instruction. As used herein, the term "post-completion instruction" refers to an instruction composed of several micro operations, where some or all of these operations take place after the instruction completion boundary. Complex instructions can be highly serialized in nature, limiting the benefits of out of order execution. This is common for operations involving encryption. To overcome the above disadvantage, the post-completion instruction is suggested. The post-completion instruction allows the instruction to bypass the traditional processor pipeline and architecturally complete before starting execution of the instruction, essentially moving the "start of the execution" pipeline to the tail end of the traditional processor pipeline. The post-completion instruction can make the SMT processor confused as the disruptive complex instruction can appear to be moving "fast" when in reality the complex instruction hits an architectural wall and ends up stalling for a long time. (i.e., The SMT processor recognizes the post-completion instruction has ended when the completion sign occurs even though the execution step remains.) These disruptive complex instructions still appear to the SMT processor to be efficiently utilizing shared resources and therefore are granted a larger and larger pool of shared resources to use. Once a thread hits this type of complex instruction, it becomes difficult to un-allocate the shared resources the thread has already been granted and also becomes difficult to give these resources away to other potentially fast-moving threads. This means that the traditional thread balancing mechanisms tracking instructions in flight from dispatch to completion will improperly allocate resources to a thread that doesn't necessarily need them.

Figure 2:
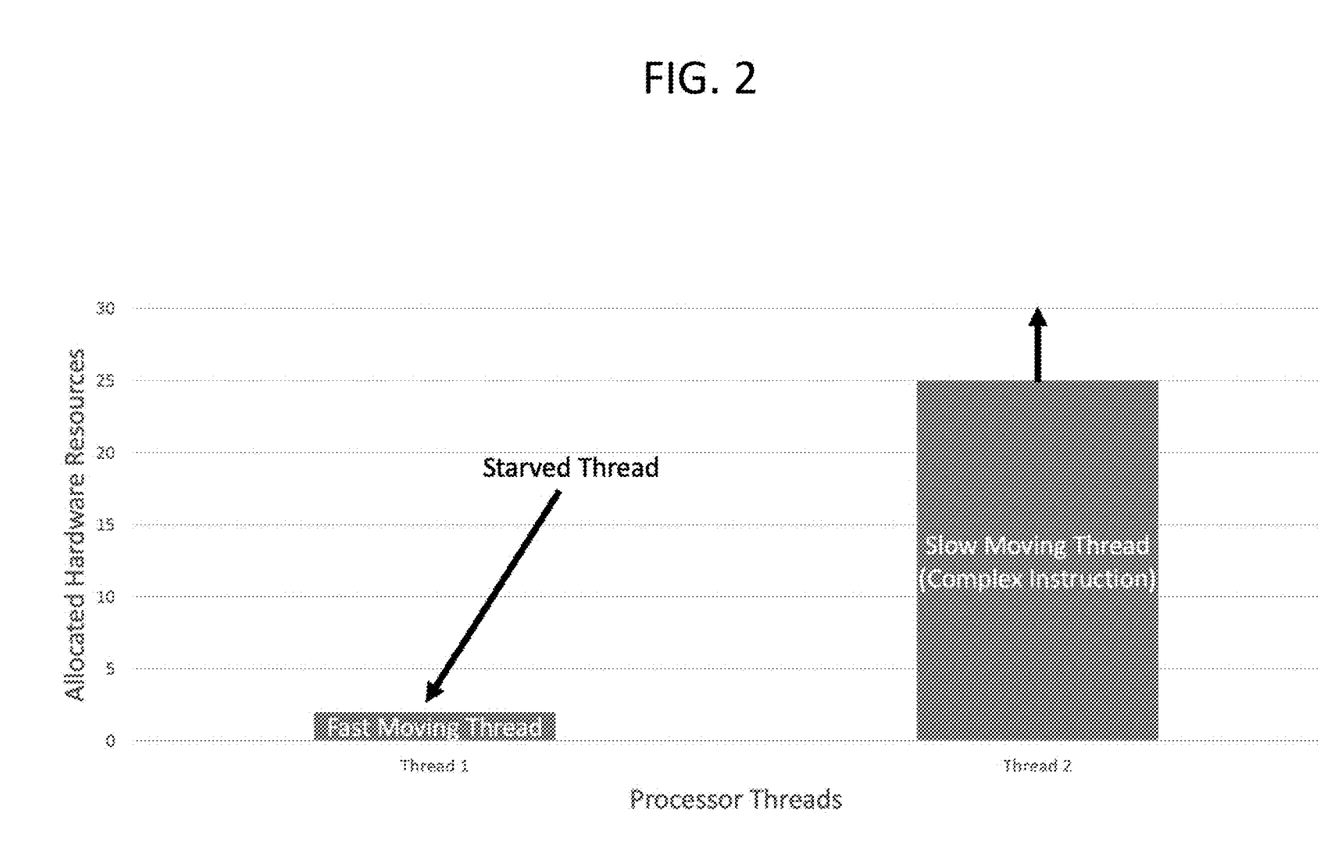
FIG. 2 depicts a problematic scenario where the fast-moving thread is starved out by the slow-moving thread.

FIG. 2 shows a problematic scenario where the fast-moving thread is starved out by the slow-moving thread by the above reason (i.e., the traditional thread balancing logic allocates too many resources to the thread executing the disruptive complex instruction, for example, 95% of the resource is allocated to the thread executing the post-completion instruction). In this case, the slow-moving thread is processing a disruptive complex instruction, and the slow-moving thread continues to ask for further hardware resources as it is unaware of the disruptive complex instruction's nature to halt the pipeline after it has completed. Several existing methods such as keeping track of how well a thread has been completing instructions over a rolling window in time won't work for the post-completion instructions that stall the pipeline after completion of the instruction.

The present invention has an advantage over known solutions as it identifies instructions dynamically as they flow through the SMT processor and can better allocate hardware resources in these hard-to-detect scenarios.

Figure 3:
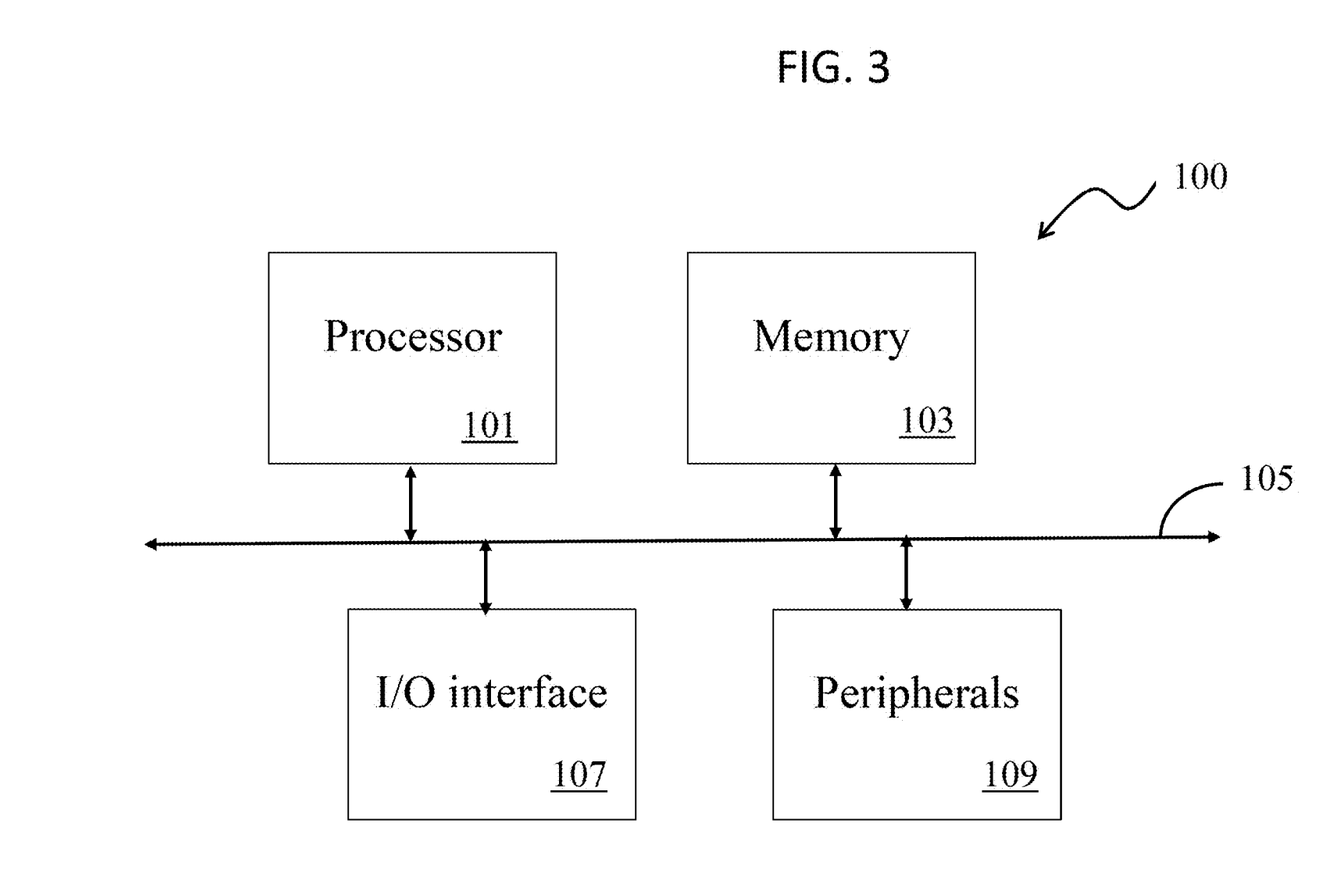
FIG. 3 is a block diagram showing a computer processing system with a multi-thread processor according to one or more embodiments of the present invention.

FIG. 3 is a block diagram showing a computer processing system 100 with a multi-thread processor 101 according to one or more embodiments of the present invention. In accordance with one or more embodiments of the present invention, the computer processing system 100 includes the multithread processor 101, a memory 103, input/output (I/O) interfaces 107, and other peripheral devices or modules 109 that are bi-directionally coupled to a bus 105 to allow communication between components. The multi-thread processor 101 may be a CPU, microprocessor, or cryptographic engine. The bus 105 may communicate with elements external to the computer system 100. Alternate embodiments of the present invention may use more, less, or different components and functional blocks than those illustrated in FIG. 3.

In accordance with additional or alternative embodiments of the present invention, the computer processing system 100 may include two or more of processors 101. If a plurality of processors 101 is used in the computer processing system 100, any number of them may be the same type, or of different types. Although the computer processing system 100 may have a plurality of processors 101, a single processor 101 by itself can execute a plurality of instruction threads. The memory 103 can include a multi-level cache architecture including one or more levels of instruction cache and data cache. Memory 103 can also include an external memory that is also referred to as a main memory and can optionally include additional devices such as buffers and the like.

Figure 4:
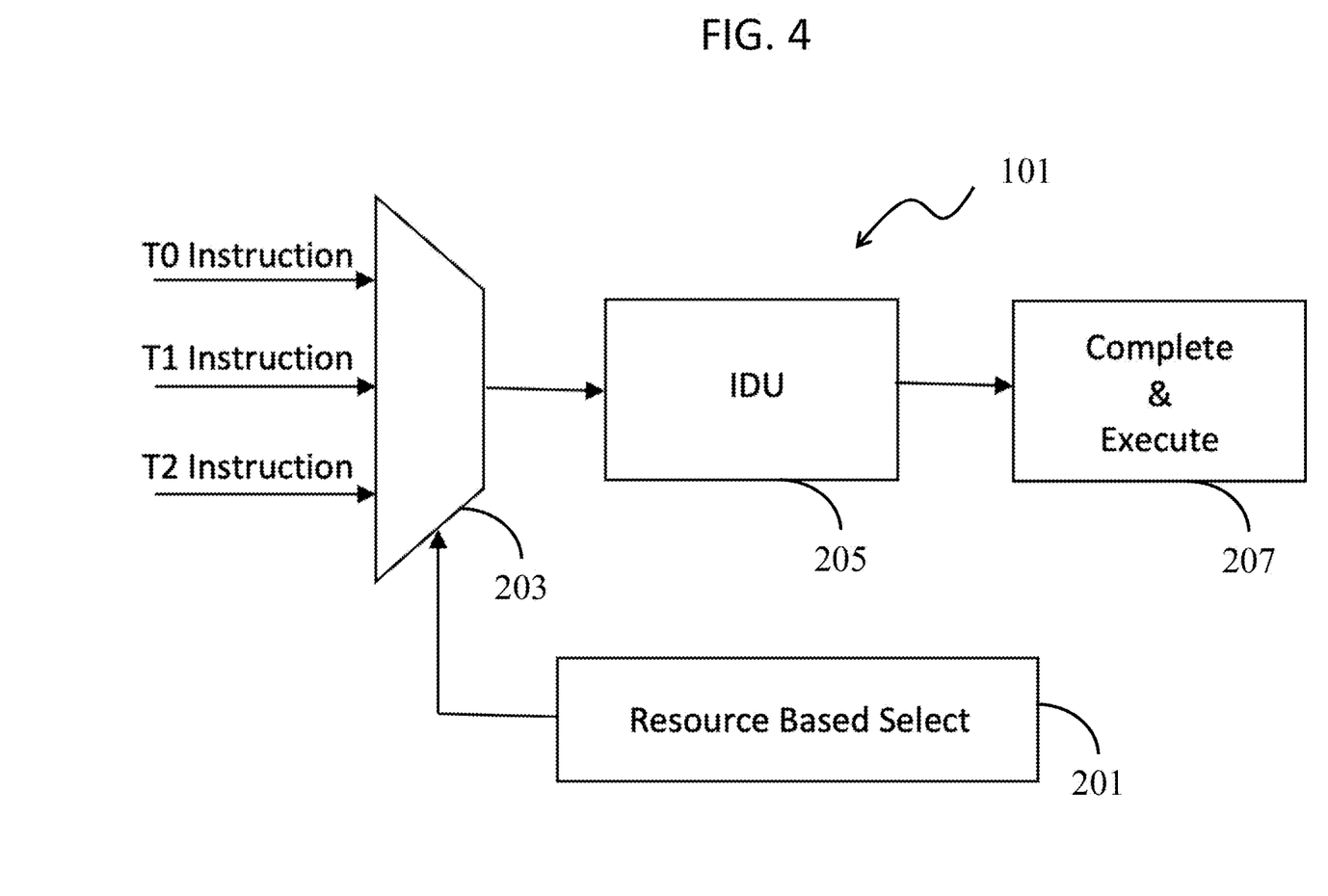
FIG. 4 is a block diagram showing details of the multi-thread processor of FIG. 3 according to one or more embodiments of the present invention.

FIG. 4 is a block diagram showing details of the multi-thread processor 101 according to one or more embodiments of the present invention. A decoder (not shown) decodes an instruction and extracts information regarding a type of the instruction (e.g., simple instruction, complex instruction, and disruptive complex instruction). In accordance with one or more embodiments of the present invention, the multi-thread processor 101 may recognize the type of the instruction by the identifier of the instruction (e.g., as a form of opcode). Here, instructions are allocated to threads T0, T1 and T2 respectively before the decoder decodes the instructions.

In accordance with one or more embodiments of the present invention, if the multi-thread processor 101 determines that the type of the instruction is disruptive complex, the multi-thread processor 101 changes the resource allocation rule among the threads T0, T1 and T2 from the traditional thread-based allocation rule to the fixed allocation rule (so-called "instruction-based allocation mode") suggested by the present application. One way to implement the fixed allocation method according to the present invention is to fix the number of shared resources to a pre-defined value based upon the type of instruction that was encountered by a thread. This allows the multi-thread processor 101 to override the traditional thread balancing mechanisms to prevent a poor distribution of hardware resources between threads.

Instruction issue queue, instruction execution unit, rename register, completion table and reorder buffer are examples of shared resources within a processor. Among them, the completion table is used to indicate which of the dispatched instructions have completed. The multi-thread processor 101 records each instruction into a completion table entry after decoding the instruction and before dispatching the instruction, and each completion table entry is allotted to a thread. Since a hardware resource that works well to alter the balance among threads is the number of allowed completion table entries per thread, restricting the number of completion table entries effectively may constrain the number of in-flight instructions utilized by a given thread. For example, the number of hardware resources given to a thread is controlled by setting that the thread is not allowed to have more than X number of entries in the completion table artificially even if there is more available space in the completion table.

In accordance with one or more embodiments of the present invention, a micro-architecturally visible control bit can be used to indicate to enter/exit the fixed allocation mode. The control bit can be set and cleared through micro operations within a millicode routine, for example. As used herein, the term "millicode" refers to low level code that is transparent from an application perspective and is used to implement instructions or parts of instructions. In accordance with one or more embodiments of the present invention, the SMT processor 101 uses the millicode to operate the fixed allocation mode. In accordance with one or more embodiments of the present invention, the control bit can be set and cleared dynamically during processor execution, and the exact duration of the fixed allocation mode can be determined by a pre-defined count or through the detection of the end of a micro operation routine such as the clearing of the micro-architectural control bit. In other words, the proportion of resource allocation can be changed on a per instruction basis or for only part of a complex instruction.

A resource-based selector 201 has information regarding the predetermined number of shared resources (e.g., a number of completion table entries) to be allotted based upon the type of instruction. If the multi-thread processor 101 determines that the type of the instruction is disruptive complex, the resource-based selector 201 controls a multiplexer 203 so that the instruction from each thread (e.g., one of threads T0, T1 and T2) is stalled at the multiplexer 203 in the case that the thread balancing logic in the resource-based selector 201 has not allocated enough resources to that thread. After the instruction in the thread passes this point, the instruction in the thread enters the pipeline and flows through the multi-thread processor 101. For example, each thread then manages the decoded instruction to be dispatched in an instruction dispatch unit (IDU) 205 and to be completed and executed in the completion and execution unit 207. The order between completion and execution in the completion and execution unit 207 is not limited in a particular way. In accordance with one or more embodiments of the present invention, the order between completion and execution can be determined by the instruction type.

Even though FIG. 4 shows a multi-thread processor including a resource allocator, an instruction dispatch unit, and a completion and execution unit, the present invention is not limited to the above structure. In accordance with additional or alternative embodiments of the present invention, some of the above elements in the multi-thread processor may be located outside the multi-thread processor. For example, buffers or caches included in the elements of the multi-thread processor may be located in the memory 103 which is outside the processor 101.

Figure 5:
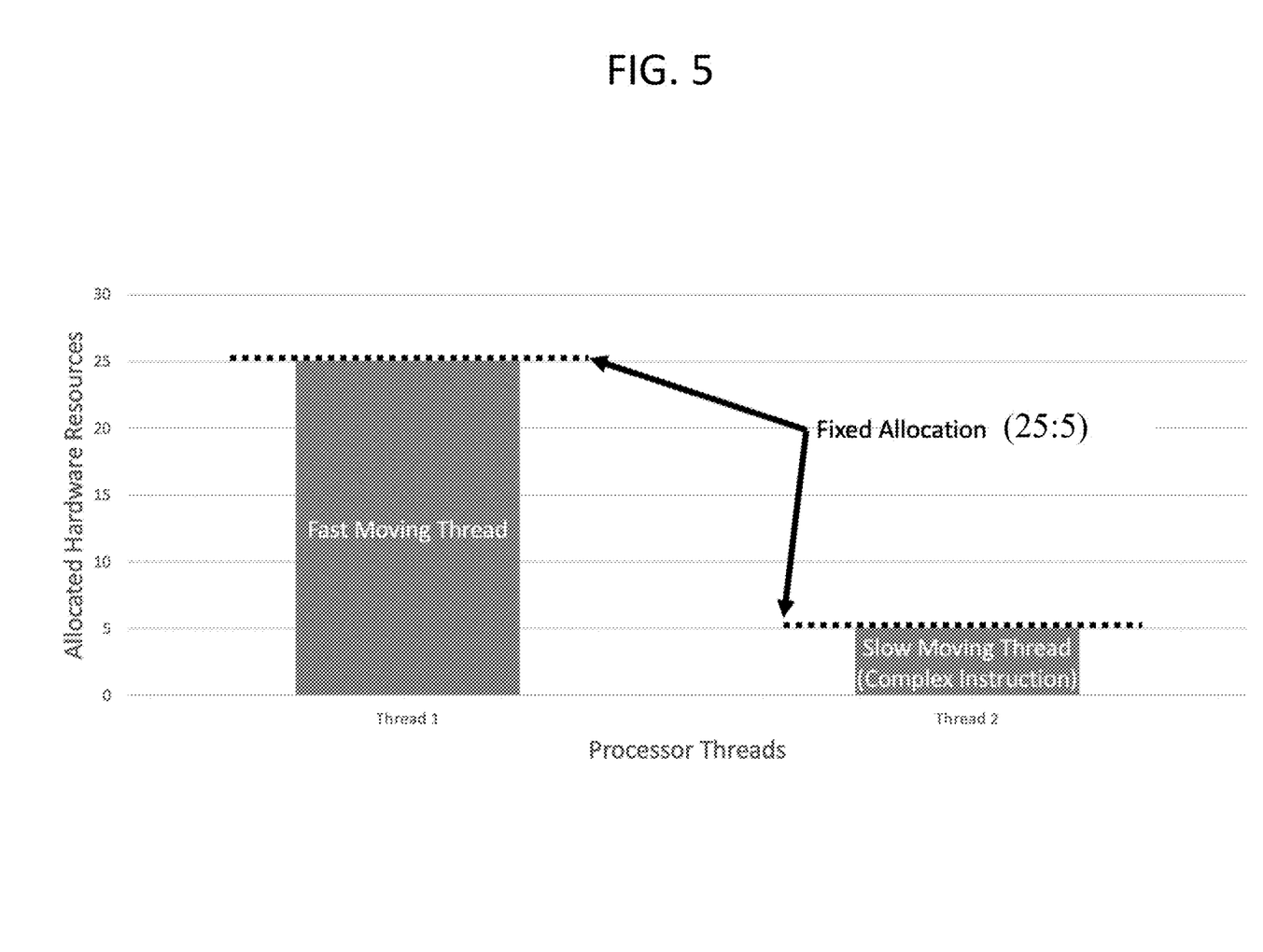
FIG. 5 depicts an example of resource allocation according to one or more embodiments of the present invention.

FIG. 5 depicts an example of resource allocation according to one or more embodiments of the present invention. Resource allocation can be determined based upon the types of instructions encountered by the threads. For example, Thread 1 is fixed to a large pool of resources and Thread 2 is fixed to a specific value (e.g., 25:5, or 2:1) in the case that simple instructions are allocated to the Thread 1 and the disruptive complex instruction is allocated to the Thread 2. In accordance with one or more embodiments of the present invention, the amount of the hardware resources allotted to the Thread 1 is more than two times of the amount of the hardware resources allotted to the Thread 2. In accordance with additional or alternative embodiments of the present invention, the amount of the hardware resources allotted to the Thread 1 is more than four times of the amount of the hardware resources allotted to the Thread 2. In a case of running similar workloads (e.g., both threads encounter disruptive complex threads) to two threads, each thread may use between 40% to 60% of the resources. By artificially restricting the number of hardware resources the slow-moving thread is able to use to a smaller amount compared to that of hardware resources allotted to the fast-moving thread, therefore the overall processing speed of the SMT processor 101 can increase.

Figure 6:
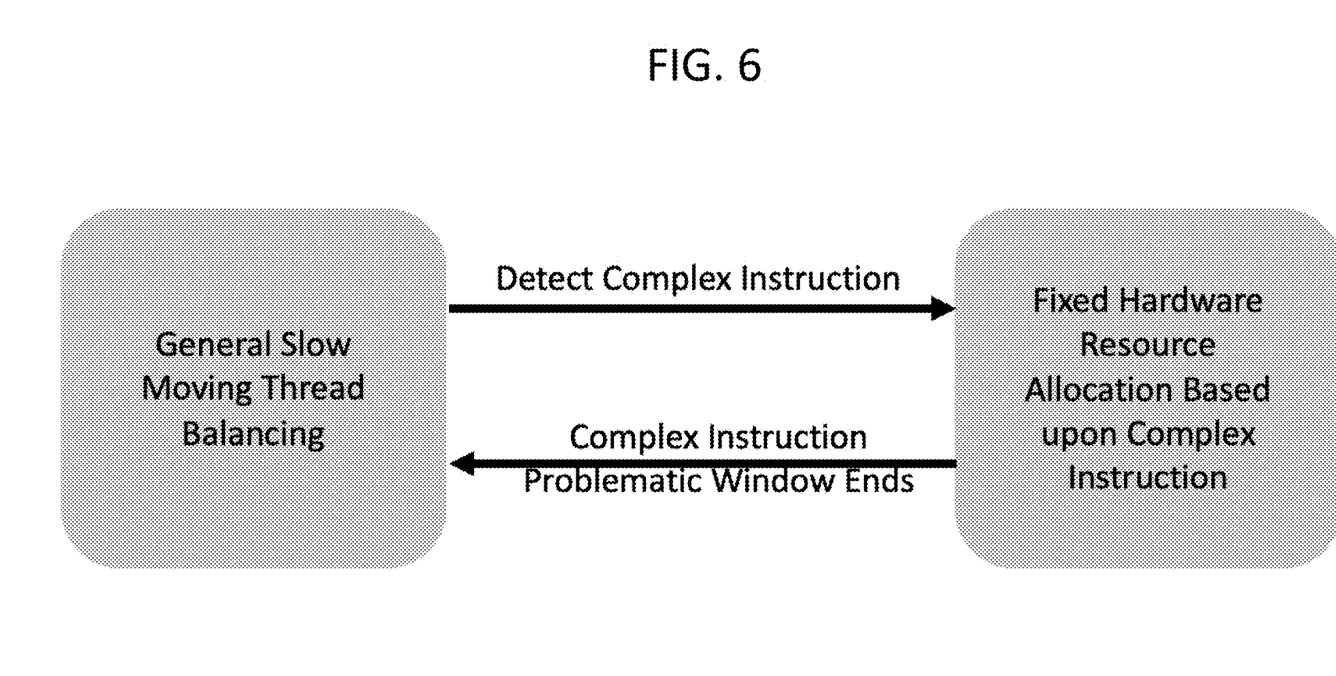
FIG. 6 shows a transition diagram depicting transitions between the fixed allocation scheme and the traditional allocation scheme.

FIG. 6 shows a transition diagram depicting when the SMT processor 101 transitions into this fixed allocation scheme and through what mechanism it returns. The fixed allocation is started on detection of the complex instruction through the use of a micro-architectural control bit. The SMT processor 101 stays in this alternate thread balancing scheme as long as the complex instruction requires based upon the expected number of resources the thread will require to operate on this complex instruction. The exact duration can be determined by a pre-defined count or through the detection of the end of a micro operation routine such as the clearing of the micro-architectural control bit. In accordance with one or more embodiments of the present invention, the SMT processor 101 seamlessly returns to the general slow-moving thread balancing at the completion of the complex instruction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system, comprising:
a memory storing a computer-executable instruction; and
a processor configured to:
  allocate the computer-executable instruction to a first thread;
  decode the computer-executable instruction;
  determine a type of the computer-executable instruction based on information obtained by decoding the computer-executable instruction; and
  based on determining that the computer-executable instruction is a disruptive complex instruction, change a mode of allocating hardware resources to an instruction-based allocation mode,
  wherein, in the instruction-based allocation mode, the processor adjusts allocation of the hardware resources among the first thread and a second thread to predetermined fixed amounts, for the duration from start to end of processing of the disruptive complex instruction by the processor, based on types of instructions allocated to the first and second threads,
  wherein the processor adjusts the allocation of the hardware resources to the first thread by restricting a number of completion table entries allowed to the first thread in the instruction-based allocation mode, and
  wherein the disruptive complex instruction includes an instruction composed of several micro operations, and some of the micro operations take place after instruction completion boundary.

2. The computer system according to claim 1, wherein the processor is further configured to:
  change the mode of allocating the hardware resources to a thread-based allocation mode after a predetermined time has passed since changing the mode of allocating the hardware resources to the instruction-based allocation mode, wherein the predetermined time is the duration from start to end of the processing of the disruptive complex instruction by the processor, and
  wherein in the thread-based allocation mode, the processor allocates the hardware resources among the first thread and the second thread based on track information of how the threads utilize the hardware resources on a per thread basis.

3. The computer system according to claim 1, wherein a control bit that indicates to enter the instruction-based allocation mode is set and cleared through micro operations.

4. The computer system according to claim 1, wherein, in response that a simple instruction is allocated to the second thread, fewer hardware resources than a number of the hardware resources allocated to the second thread are allocated to the first thread in the instruction-based allocation mode.

5. A computer-implemented method comprising:
   allocating, by a processor, an instruction to a first thread;
   decoding, by the processor, the instruction;
   determining, by the processor, a type of the instruction based on information obtained by decoding the instruction; and
   based on determining that the instruction is a disruptive complex instruction, changing a mode of allocating hardware resources to an instruction-based allocation mode,
   wherein in the instruction-based allocation mode, the processor adjusts allocation of the hardware resources among a first thread and a second thread to predetermined fixed amounts, for the duration from start to end of processing of the disruptive complex instruction by the processor, based on types of instructions allocated to the first and second threads,
   wherein the processor adjusts the allocation of the hardware resources to the first thread by restricting a number of completion table entries allowed to the first thread in the instruction-based allocation mode, and
   wherein the disruptive complex instruction includes an instruction composed of several micro operations, and some of the micro operations take place after instruction completion boundary.

6. The computer-implemented method according to claim 5, further comprising changing the mode of allocating the hardware resources to a thread-based allocation mode after a predetermined time has passed since changing the mode of allocating the hardware resources to the instruction-based allocation mode, wherein the predetermined time is the duration from start to end of the processing of the disruptive complex instruction by the processor, and
   wherein in the thread-based allocation mode, the processor allocates the hardware resources among the first thread and the second thread based on track information of how the threads utilize the hardware resources on a per thread basis.

7. The computer-implemented method according to claim 5, wherein a control bit that indicates to enter the instruction-based allocation mode is set and cleared through micro operations.

8. A computer program product comprising a computer readable storage medium having program instructions embodied therewith, the program instructions executable by a processor to cause the processor to perform a method comprising:
   allocating a target instruction to a first thread;
   decoding the target instruction different from the program instructions;
   determining a type of the target instruction based on information obtained by decoding the target instruction; and
   based on determining that the target instruction is a disruptive complex instruction, changing a mode of allocating hardware resources to an instruction-based allocation mode,
   wherein in the instruction-based allocation mode, the processor adjusts allocation of the hardware resources among a first thread and a second thread to predetermined fixed amounts, for the duration from start to end of processing of the disruptive complex instruction by the processor, based on types of instructions allocated to the first and second threads,
   wherein the processor adjusts the allocation of the hardware resources to the first thread by restricting a number of completion table entries allowed to the first thread in the instruction-based allocation mode, and
   wherein the disruptive complex instruction includes an instruction composed of several micro operations, and some of the micro operations take place after instruction completion boundary.

9. The computer program product according to claim 8, the method further comprising changing the mode of allocating the hardware resources to a thread-based allocation mode after a predetermined time has passed since changing the mode of allocating the hardware resources to the instruction-based allocation mode, wherein the predetermined time is the duration from start to end of the processing of the disruptive complex instruction by the processor, and
   wherein in the thread-based allocation mode, the processor allocates the hardware resources among the first thread and the second thread based on track information of how the threads utilize the hardware resources on a per thread basis.

10. The computer program product according to claim 8, wherein a control bit that indicates to enter the instruction-based allocation mode is set and cleared through micro operations.

* * * * *